United States Patent Office 3,517,064
Patented June 23, 1970

3,517,064
PROCESS FOR THE PREPARATION OF TRIALKYLHYDRAZINES
Henri Sidi, Paramus, N.J., assignor to Tenneco Chemicals, Inc., a corporation of Delaware
No Drawing. Filed Oct. 25, 1967, Ser. No. 677,867
Int. Cl. C07c 109/02
U.S. Cl. 260—583
5 Claims

ABSTRACT OF THE DISCLOSURE

Trialkylhydrazines are prepared by the hydrogenation of alkylidenedialkylhydrazines in the presence of noble metal and Raney nickel hydrogenation catalysts.

This invention relates to a process for the preparation of trialkylhydrazines. More particularly, it relates to a process for the preparation of trialkylhydrazines by the catalytic hydrogenation of alkylidenedialkylhydrazines.

A number of processes for the preparation of trialkylhydrazines have been suggested in the literature. For example, Klages et al. [Ann. 547, 1 (1941)] tried to prepare trimethylhydrazine by coupling two molecules of dimethylchloramine using copper-bronze, by reacting dimethylchloramine with dimethylamidomagnesium halide, and by reacting aqueous formaldehyde with hydrazine hydrochloride, but none of these reactions yielded the desired compound. These investigators also reported that their attempts to prepare trimethylhydrazine by the catalytic reduction of methylenedimethylhydrazine failed because of resinification on the catalyst. Class, Aston, and Oakwood [J. Am. Chem. Soc. 75, 2937–9 (1953)] described a process in which dimethylhydrazine was condensed with formaldehyde to form methylenedimethylhydrazine, which was then contacted in ether solution with lithium aluminum hydride to form trimethylhydrazine.

In accordance with the present invention, it has been found that trialkylhydrazines can be produced in good yields by contacting alkylidenedialkylhydrazines with hydrogen in the presence of a hydrogenation catalyst. This process is more economical to operate than that described by Class et al. since it uses hydrogen rather than lithium aluminum hydride as the reducing agent. In addition it is simpler and safer to operate because the reaction is ordinarily carried out in water rather than in ether solution.

The process of this invention may be conveniently carried out by subjecting an aqueous solution of an alkylidenedialkylhydrazine to treatment with hydrogen in the presence of a noble metal or Raney nickel hydrogenation catalyst. After such treatment, the trialkylhydrazine is separated from the hydrogenation catalyst and may if desired be recovered from the aqueous solution.

The alkylidenedialkylhydrazines that are hydrogenated in accordance with the process of this invention have the structural formula

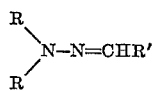

wherein each R represents an alkyl group having from 1 to 4 carbon atoms and R' represents hydrogen or an alkyl group having from 1 to 3 carbon atoms. Illustrative of these compounds are methylenedimethylhydrazine, ethylidenedimethylhydrazine, ethylidenediethylhydrazine, propylidenediethylhydrazine, butylidenedimethylhydrazine, methylenedipropylhydrazine, methylenedibutylhydrazine, methylenemethylbutylhydrazine, and the like. The alkylidenedialkylhydrazines may be prepared by the condensation of the appropriate N,N-dialkylhydrazine with an aliphatic aldehyde having from 1 to 4 carbon atoms at a temperature between about 5° and 50° C.

The hydrogenation catalysts that may be used in the practice of this invention include Raney nickel catalysts and the noble metal catalysts such as platinum, platinum oxide, palladium, palladium oxide, and gold. To reduce their cost, the noble metal catalysts are usually deposited on such inert carriers as carbon, alumina, and chromium oxide. The amount of the hydrogenation catalyst that is used is about 1 percent to 10 percent of the weight of the alkylidenedialkylhydrazine. Particularly satisfactory results have been obtained using 3 percent to 7 percent, based on the weight of the alkenylidendialkylhydrazine, of a hydrogenation catalyst that comprises 5 percent to 10 percent by weight of palladium on a carbon carrier.

The process of this invention may be carried out under the conditions that are ordinarily employed for hydrogenation reactions using noble metal and Raney nickel hydrogenation catalysts. When a noble metal catalyst is used, the hydrogenation may be carried out at a temperature between about 20° C. and 100° C. and under a hydrogen pressure of about 5 p.s.i. to 100 p.s.i. It is generally preferred to carry out the hydrogenation with a noble metal catalyst at room temperature (25° to 30° C.) and under a hydrogen pressure of 10 p.s.i. to 20 p.s.i. Whenever the pressure drop indicates that a substantial amount of the hydrogen has been absorbed, the reaction is repressurized to 10 p.s.i. to 20 p.s.i. The hydrogenation is continued in this way until the desired amount of hydrogen has reacted. All of the hydrogenation catalyst may be present throughout the hydrogenation reaction. Alternatively, a portion of the catalyst may be present at the start and the remainder added in one or more portions during the hydrogenation.

The invention is further illustrated by the examples that follow. In these examples, all percentages are percentages by weight.

EXAMPLE 1

To a mixture of 84 grams (1.4 moles) of N,N-dimethylhydrazine and 48 grams (2.67 moles) of water was added dropwise 130 grams (1.6 moles) of a 37% formaldehyde solution while the temperature of the reaction mixture was maintained between 25° and 30° C.

The resulting aqueous solution of methylenedimethylhydrazine and 2 grams of 5% palladium-on-carbon catalyst were placed in a 350 ml. Parr hydrogenation bottle. The reduction was carried out at 25° to 30° C. under a hydrogen pressure of about 10 p.s.i. to 20 p.s.i. Whenever the drop in the hydrogen pressure indicated that most of the hydrogen had reacted, the bottle was repressurized to 10 p.s.i. to 20 p.s.i. with hydrogen. The reaction was continued until the total hydrogen pressure drop amounted to 115 p.s.i. (the theoretical total pressure drop was 114.5 p.s.i.). During the reaction two additional 2 gram portions of the hydrogenation catalyst were added to the reaction mixture.

The reaction mixture was filtered to remove the catalyst and then distilled under atmospheric pressure. There was obtained 328.9 grams of a colorless aqueous solution that contained 26.01% of trimethylhydrazine. The yield of trimethylhydrazine was 82.3%.

To a 100 gram portion of the aqueous trimethylhydrazine solution was added 200 grams of a 50% sodium hydroxide solution while the temperature was maintained at 25° to 30° C. The organic layer that formed was separated, dried with solid potassium hydroxide, and distilled at atmospheric pressure in the presence of a few pellets of potassium hydroxide. There was obtained 10.7 grams of anhydrous trimethylhydrazine that boiled at 60°–66° C. at atmospheric pressure and that contained 37.1% N, 46.0% C, and 13.1% H (calculated for

37.8% N, 48.7% C, and 13.5% H). Its molecular weight was found by a titration technique to be 79. Infrared analysis verified by trimethylhydrazine structure.

EXAMPLE 2

To a mixture of 84 grams (1.4 moles) of N,N-dimethylhydrazine and 48 grams of water was added dropwise 70.5 grams (1.6 moles) of acetaldehyde while the temperature of the reaction mixture was maintained at 10° to 15° C.

The resulting aqueous solution of ethylidenedimethylhydrazine and 2 grams of a 5% palladium-on-carbon hydrogenation catalyst were placed in a 350 ml. Parr hydrogenation bottle. The reduction was carried out at 25° to 30° C. under a hydrogen pressure of 10 to 20 p.s.i. Whenever the drop in the hydrogen pressure indicated that most of the hydrogen had reacted, the bottle was repressurized to 10 p.s.i. to 20 p.s.i. with hydrogen. The reaction was continued until the total hydrogen pressure drop amounted to 111.5 p.s.i. During the hydrogenation additional portions of the hydrogenation catalyst were added to the reaction mixture until a total of 9 grams of the catalyst had been added.

The reaction mixture was filtered to remove the catalyst and then distilled under atmospheric pressure. There was obtained 252.0 grams of a colorless aqueous solution that contained 37.78% of N,N-dimethyl-N'-ethylhydrazine. The yield of N,N-dimethyl-N'-ethylhydrazine was 77%.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. A process for the preparation of trialkylhydrazines having the structural formula

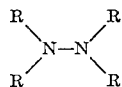

wherein each R represents an alkyl group having from 1 to 4 carbon atoms which comprises contacting an alkylidenedialkylhydrazine having the structural formula

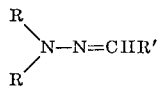

wherein R' represents hydrogen or an alkyl group having from 1 to 3 carbon atoms with hydrogen in the presence of a hydrogenation catalyst selected from the group consisting of noble metal and Raney nickel catalysts at a temperature in the range of about 20° to 100° C. and a hydrogen pressure in the range of about 5 p.s.i. to 100 p.s.i.

2. The process of claim 1 wherein the alkylidenedialkylhydrazine is methylenedimethylhydrazine.

3. The process of claim 1 wherein the alkylidenedialkylhydrazine is ethylidenedimethylhydrazine.

4. The process of claim 1 wherein the hydrogenation catalyst is palladium.

5. The process of claim 4 wherein the hydrogenation is carried out at 25° to 30° C. and a hydrogen pressure of 10 p.s.i. to 20 p.s.i.

References Cited

UNITED STATES PATENTS 3,051,707   8/1962   Biel.

CHARLES B. PARKER, Primary Examiner

R. L. RAYMOND, Assistant Examiner